(12) United States Patent
Xu et al.

(10) Patent No.: US 11,265,587 B2
(45) Date of Patent: Mar. 1, 2022

(54) MULTIMEDIA RESOURCE SYNCHRONOUS PUSHING METHOD BASED ON HETEROGENEOUS NETWORK

(71) Applicant: SHANGHAI JIAO TONG UNIVERSITY, Shanghai (CN)

(72) Inventors: Yiling Xu, Shanghai (CN); Wenjun Zhang, Shanghai (CN); Shan Feng, Shanghai (CN); Hao Chen, Shanghai (CN); Yanfeng Wang, Shanghai (CN); Jun Sun, Shanghai (CN); Yunfeng Guan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 259 days.

(21) Appl. No.: 16/319,531

(22) PCT Filed: Aug. 29, 2017

(86) PCT No.: PCT/CN2017/099434
§ 371 (c)(1),
(2) Date: Jan. 22, 2019

(87) PCT Pub. No.: WO2018/041092
PCT Pub. Date: Mar. 8, 2018

(65) Prior Publication Data
US 2021/0099742 A1    Apr. 1, 2021

(30) Foreign Application Priority Data

Aug. 29, 2016 (CN) .......................... 201610757375.1

(51) Int. Cl.
*H04N 21/242*    (2011.01)
*H04L 12/26*    (2006.01)
(Continued)

(52) U.S. Cl.
CPC ....... *H04N 21/242* (2013.01); *H04L 43/0858* (2013.01); *H04L 43/0864* (2013.01); *H04N 21/64738* (2013.01); *H04N 21/64769* (2013.01)

(58) Field of Classification Search
CPC .......... H04N 21/242; H04N 21/64738; H04N 21/64769; H04L 43/0858
See application file for complete search history.

(56) References Cited

U.S. PATENT DOCUMENTS 6,148,005 A * 11/2000 Paul .................. H04N 7/17318
348/E7.071
7,027,766 B2 * 4/2006 McAlinden ........ H04N 7/17336
348/E7.073
(Continued)

FOREIGN PATENT DOCUMENTS

CN    101304351 A    12/2008
CN    101938456 A     5/2011
(Continued)

OTHER PUBLICATIONS

International Search Report of PCT/CN2017/099434.
Written opinion of PCT/CN2017/099434.
Published International Application of PCT/CN2017/099434.

*Primary Examiner* — James R Sheleheda
(74) *Attorney, Agent, or Firm* — Dragon Sun Law Firm, PC; Jinggao Li, Esq.

(57) ABSTRACT

The present disclosure discloses a method for synchronously pushing a multimedia resource based on a heterogeneous network. The method includes: step 1: obtaining, by a server, end-to-end broadband network delay information or broadband network delay and available bandwidth information of different users; step 2: after receiving a client request, calculating, by the server according to the end-to-end broadband network delay information or the broadband network (Continued)

delay and available bandwidth information of the different users, a moment at which the multimedia resource can be synchronously presented; and step 3: sending, by the server, the multimedia resource after the moment at which the multimedia resource can be synchronously presented, and synchronously playing, by a client, content according to a start presentation time of the multimedia resource, so that broadband content of the different users can be synchronously presented.

19 Claims, 4 Drawing Sheets

(51) Int. Cl.
*H04N 21/647* (2011.01)
*H04L 43/0852* (2022.01)
*H04L 43/0864* (2022.01)

(56) References Cited

U.S. PATENT DOCUMENTS

| | | | |
|---|---|---|---|
| 8,332,898 B2* | 12/2012 | Taylor | H04N 21/242 725/97 |
| 8,826,350 B1* | 9/2014 | Maeng | H04N 7/152 725/97 |
| 9,183,558 B2* | 11/2015 | Davy | H04N 21/8133 |
| 2001/0003523 A1 | 6/2001 | Crandall et al. | |
| 2004/0244057 A1* | 12/2004 | Wallace | H04N 7/165 725/135 |
| 2007/0283380 A1* | 12/2007 | Aoki | H04N 7/15 725/32 |
| 2008/0172708 A1* | 7/2008 | Perry | H04W 72/005 725/110 |
| 2009/0059962 A1* | 3/2009 | Schmidt | H04N 21/4307 370/503 |
| 2012/0082424 A1* | 4/2012 | Hubner | H04N 21/6405 386/219 |
| 2012/0131204 A1* | 5/2012 | Song | H04L 12/1822 709/227 |
| 2014/0098811 A1* | 4/2014 | Bouazizi | H04L 1/0045 370/389 |
| 2015/0032797 A1* | 1/2015 | Pan | H04L 65/607 709/203 |
| 2015/0382050 A1* | 12/2015 | Le Nerriec | H04L 43/16 725/80 |
| 2016/0366206 A1* | 12/2016 | Shemer | G06F 9/54 |

FOREIGN PATENT DOCUMENTS

| | | | |
|---|---|---|---|
| CN | 102572611 A | | 11/2012 |
| CN | 104813303 A | * | 7/2015 |

* cited by examiner

MULTIMEDIA RESOURCE SYNCHRONOUS PUSHING METHOD BASED ON HETEROGENEOUS NETWORK

CROSS-REFERENCE TO RELATED APPLICATIONS

This application is a national stage application of PCT Application No. PCT/CN2017/099434. This application claims priority from PCT Application No. PCT/CN2017/099434, filed Aug. 29, 2017, and CN Application No. 201610757375.1, filed Aug. 29, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technical Field

The present disclosure relates to a heterogeneous media network transmission method in the field of information technologies, and in particular, to a method for synchronously pushing a multimedia resource based on a heterogeneous network.

Related Art

With the rapid development of network technologies, the media presentation manner has undergone earth-shaking changes, and new forms of media have emerged one after another. Traditional TV is no longer the main way for people to obtain information and entertainment. More terminal devices appear, such as PCs connected to the Internet, mobile phones belonging to almost everybody, and mobile tablet computers that are becoming increasingly popular. These new products have started to slowly erode the market of traditional TV services. The multimedia services, along with the development of ever-changing mobile communication and broadband wireless technologies, are becoming increasingly mature. Large-scale media convergence has become an inevitable trend. In this process, new ideas and high-end products are constantly appearing, enabling users to conveniently access the network, so as to enjoy richer media content and diversified services with ease.

At the same time, the presentation of media content is no longer only simple audios, videos, and subtitles, and media types will be increasingly diversified. Media sources are no longer only specific content providers, and a growing number of producers are involved, including many individual users who are also content providers and producers. The content from different providers has various associations. To meet the individualized needs of different users, the associated content usually needs to be synchronously presented. In this environment, heterogeneous network convergence is used as an inevitable trend in the development of next-generation networks, and this fully demonstrates that future communication is no longer a specific access technology, but instead, multiple access technologies coexist and work together.

In the environment of a heterogeneous media network, the media content presented by a terminal may be simultaneously transmitted from a plurality of transmission channels, for example, a broadcast channel and a broadband channel. Media resources of the broadcast channel have the characteristics of a short delay (basically neglected), a large bandwidth and high stability, and bandwidths and network delays greatly vary for different broadband channels (WIFI, 3G/4G, or the like).

Therefore, in a heterogeneous network media resource service formed by a broadcast and a broadband, due to the difference in the status of broadband channel networks, there are three cases of asynchronization: a server pushes media content to users through broadcast; if the users request for broadband resources of the same media content, the delay and bandwidth of the broadband network may cause the content received by the client from the broadcast and the broadband to be asynchronous on a timeline; the server pushes the same media content to users through broadcast and broadband; if the users request to replace a broadband resource media stream (for example, different view angles or different audios), when the media stream is switched, because different broadband networks have different delays and bandwidths, new bandwidth content and broadcast content of the terminal are asynchronous; the server pushes the same media content to users through broadcast and broadband; if the broadband network condition deteriorates at a particular moment, the broadband channel play is not smooth, and when the video is played again smoothly, broadcast and broadband resources between different users are asynchronous.

Therefore, the way of enabling the server to synchronously transmit a multimedia resource according to a network condition in a new-generation heterogeneous network transmission system has become a problem required to be resolved urgently.

SUMMARY

The technical problem to be resolved by the present disclosure is to provide a method for synchronously pushing a multimedia resource based on a heterogeneous network, to implement a mechanism of synchronization between content of broadcast media and content of broadband media of a server in heterogeneous network transmission, thereby resolving the problem that user media resources of broadcast and broadband are asynchronous caused by different network conditions in heterogeneous network transmission.

The present disclosure resolves the foregoing technical problem by using the following technical solutions:

a method for synchronously pushing a multimedia resource based on a heterogeneous network, where the method is one of the following two methods:

method 1: including the following steps:

step 1, obtaining, by a server, end-to-end broadband network delay information of different users;

step 2: after receiving a client request, calculating, by the server, according to the end-to-end broadband network delay information of the different users, a moment at which the multimedia resource can be synchronously presented; and step 3: sending, by the server, the multimedia resource after the moment at which the multimedia resource can be synchronously presented, and synchronously playing, by a client, content according to a start presentation time of the multimedia resource, so that broadband content of the different users can be synchronously presented;

method 2: including the following steps:

step 1: obtaining, by a server, broadband network delay and available bandwidth information of different users;

step 2: after receiving a client request, calculating, by the server according to the broadband network delay and available bandwidth information of the different users, a moment at which the multimedia resource can be synchronously presented; and step 3: sending, by the server, the multimedia resource after the moment at which the multimedia resource can be synchronously presented, and notifying a client of a play start time of content of the multimedia resource, and synchronously presenting, by different clients, broadband content according to the play start time.

Further, in the step 2 of the method 1, when broadband network delays Δt of the users are different, the server sends, at a to moment, a multimedia resource at a $t_{ini}$ moment to ensure synchronization, where $t_{ini}$ is a start moment of a first complete independent decodable media unit MU after $t_{tmp}$, where $0 \leq t_{ini} - t_{tmp} <$ MU_duration; and $t_{tmp} = t_0 + \Delta t,$ in the formula, $t_0$ is a sending moment, MU_duration is media unit duration, Δt is a downlink end-to-end broadband network delay, and $t_{tmp}$ is a moment that is obtained by calculation and at which the client receives the first independent decodable media unit MU.

Furthermore, in the method 1,
a value of MU_duration is: 0 s to 10 s; and
a value of Δt is: 0 to ∞.
More preferably, in the method 1,
the value of MU_duration is: 0.5 s; and
the value of Δt is: 2 s.

Further, in the step 3 of the method 1, content initially sent by the server is the multimedia resource after the $t_{ini}$ moment, and to enable a broadband and a broadcast to be synchronous, after receiving the first complete MU by using the broadband, the client does not immediately play the first MU, but instead, plays, at the $t_{ini}$ moment, the multimedia resource at this moment.

Further, in the method, the server sends the multimedia resource to the client, and the client synchronously plays the content according to the start presentation time of the media resource.

Further, in the step 2 of the method 2, when the broadband network delays Δt and available bandwidths $B_b$ of the users are different, the server sends, at a to moment, a multimedia resource at a $t_{ini}$ moment to ensure synchronization, where $t_{ini}$ is a start moment of a first complete independent decodable media unit MU after $t_{tmp}$, where $0 \leq t_{ini} - t_{tmp} <$ MU_duration;

MU_size=MU_duration*$B_r$; and $t_{tmp} = t_0 +$ MU_size/$B_b + \Delta t,$ in the formula, to is a sending moment, MU_size is an average size of sent MUs, MU_duration is media unit duration, $B_r$ is a constant bit rate at which the multimedia resource is played, $B_b$ is an available bandwidth of a broadband network, Δt is a downlink broadband network delay, and $t_{tmp}$ is a moment that is obtained by calculation and at which the client receives a first independent decodable media unit MU.

Furthermore, in the method 2,
a value of MU_size is: 0 Mbits to 100 Mbits;
a value of MU_duration is: 0 s to 10 s;
a value of $B_r$ is: 0 Mbps to 50 Mbps;
a value of $B_b$ is: 0 Tbps to 1 Tbps; and
a value of Δt is: 0 to ∞.
More preferably, in the method 2,
the value of MU_size is: 30 Mbits;
the value of MU_duration is: 0.5 s;
the value of $B_r$ is: 25 Mbps;
the value of $B_b$ is: 1 Mbps; and
the value of Δt is: 2 s.

Further, in the step 3 of the method 2, content initially sent by the server is the multimedia resource after the $t_{ini}$ moment, and to enable a broadband and a broadcast to be synchronous, after receiving the first complete MU by using the broadband, the client does not immediately play the first MU, but instead, plays, at the $t_{ini}$ moment, the multimedia resource at this moment.

Further, in the method 2, when sending the multimedia resource, the server sends a piece of downlink signaling to notify the client of a sequence number of a first sent independent decodable media resource to notify a user of a play time.

Further, the method 1 and the method 2 are applicable to a case in which at a particular moment, different users in a heterogeneous network media service request the server for a same multimedia resource or switch different multimedia resources or re-request for a multimedia resource due to network deterioration caused by certain conditions, to make content of the media resources synchronously presented.

The positive progress effect of the present disclosure is:
by using the foregoing method of the present disclosure, the server adopts the method for synchronously pushing a media resource or adaptively accessing a synchronous media resource for conditions of broadband networks of different users, to implement a mechanism of synchronously playing content of broadcast media and content of broadband media of the server in heterogeneous network transmission, thereby resolving the problem that media resources are asynchronous caused by different network conditions.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

The following provides preferred embodiments of the present disclosure with reference to the accompanying drawings, to describe the technical solutions of the present disclosure in detail.

Nowadays, diversified terminal presentation manners based on heterogeneous networks have become a trend of development. While watching high-quality broadcast video programs, people are increasing demands for diversified network media services. Usually, media content from a broadcast channel has a small and fixed delay, and therefore it has little effect on the synchronization of media content. Media content from a broadband, for example, audios and videos, subtitles, and multimedia applications is susceptible to the effect of a current IP network, resulting in large and jittery delays, causing problems to content synchronization.

To resolve the foregoing technical problem, implementation details of the technical solutions are described in detail below by using two embodiments of the present disclosure, to facilitate understanding of a person skilled in the art. According to different scenarios, the method of any one of the following two embodiments may be adopted. If a client can learn of end-to-end network delay information, the method in Embodiment 1 is adopted, and if the client can learn of only a broadband network delay not including the time of a process when the media resource enters the client, the method in Embodiment 2 is adopted.

Embodiment 1

Figure 1:
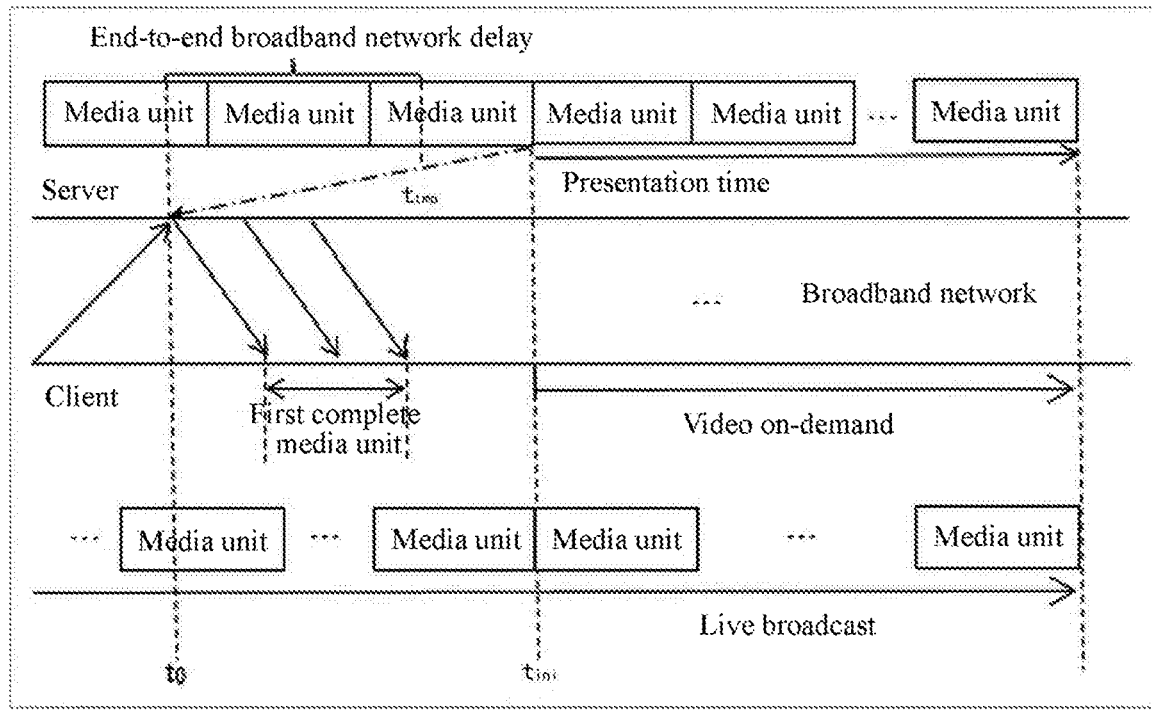
FIG. 1 is a schematic timing diagram of a first embodiment of the present disclosure.

The overall technical line of this embodiment is: to learn of end-to-end broadband network delay information of different users by using a corresponding method in a network, for changing a start time at which a server starts to transmit a broadband resource, thereby implementing synchronization of a multimedia resource in a heterogeneous network. The illustrations of this embodiment are shown in FIG. 1 and FIG. 3.

Figure 3:
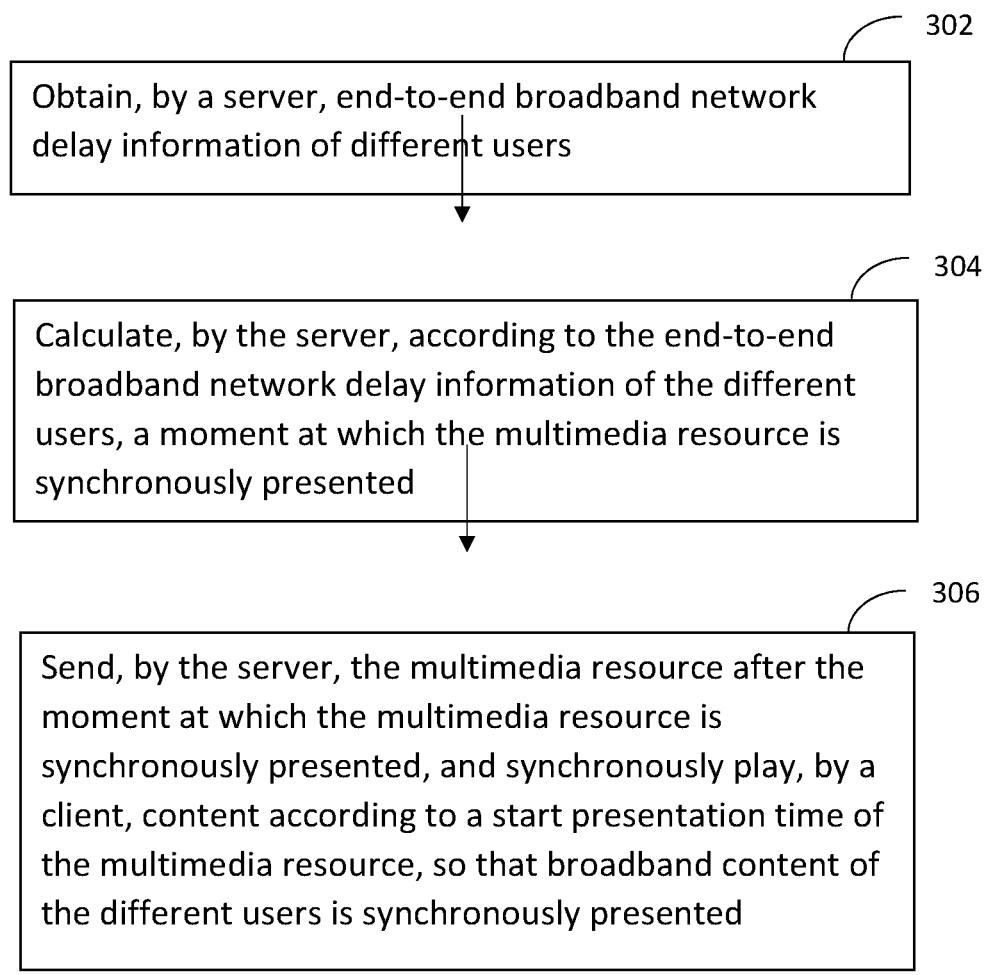
FIG. 3 is a flowchart illustrating an example method, according to the first embodiment of the present disclosure.

Specifically, method steps of this embodiment are shown in FIG. 3, and the steps include:

first, at step 302, a server may learn of end-to-end broadband network delay information of different users according to some methods, for example, by using signaling information fed back by a client, or by means of estimation measurement;

secondly, at step 304, for a case in which at a particular moment, different users in a heterogeneous network media service request the server for a same multimedia resource or switch different multimedia resources or re-request for a multimedia resource due to network condition deterioration, to make content of the multimedia resources synchronously presented, after receiving a user request, the server calculates, according to network delay conditions of different users, a moment at which the multimedia resource can be synchronously presented; and finally, at step 306, the server sends the multimedia resource after the moment at which the multimedia resource can be synchronously presented, and the client synchronously plays content according to a play start time of the media content, so that broadband part content of the different users can be synchronously presented.

Referring to FIG. 1, in a specific embodiment, the specific implementation is as follows:

step 1: a server receives a client request at a to moment, a downlink end-to-end broadband network delay of different user groups is $\Delta t$, and duration of an independent decodable media unit MU (media unit) is MU_duration;

step 2: when end-to-end broadband network delays of the users are different, the server sends, at a $t_0$ moment, a multimedia resource at a $t_{ini}$ moment to ensure synchronization, where $t_{ini}$ is a start moment of a first complete MU after $t_{tmp}$, and as shown in formula (1) and formula (2):

$$0 \leq t_{ini} - t_{tmp} < \text{MU\_duration} \quad (1)$$

$$t_{tmp} = t_0 + \Delta t \quad (2)$$

In formula (1), MU_duration is media unit duration. In formula (2), $t_0$ is a sending moment, $\Delta t$ is a downlink end-to-end broadband network delay, and $t_{tmp}$ is a moment that is obtained by calculation and at which the client receives the first MU.

In a preferred implementation, the foregoing parameters can select the following values:

MU_duration: 0 s to 10 s, preferably, 0.5 s; and $\Delta t$: 0 to $\infty$, preferably, 2 s; and step 3: because initially sent content is the multimedia source at and after the $t_{ini}$ moment, and to enable a broadband and a broadcast to be synchronous, after a client receives the first complete MU through the broadband, the first MU is not immediately played, but instead, the media content at this moment is played at and after the $t_{ini}$ moment.

A specific example of multimedia resource synchronization is provided below (a manner of a client request and a manner of notifying the client by the server are not limited, and a signaling manner is used as an example below, and signaling is based on the MMT protocol).

When a user is watching an Olympic live program, because there are a large number of excellent performances, and people have different preferences, the program party specially shoots videos in a plurality of view angles for audience to select.

At this moment, when the audience watches a main program, the audience also watches a close-up performance of a particular athlete in a small image. However, the game of the athlete is completed soon, and the audience wants to immediately change an angle to watch the posture of another athlete. Then the audience sends a request to the server. The request signaling should include an end-to-end network delay fixed_end_to_end_delay. This field can be obtained in HRBM_message, as shown in the following Table 1.1:

TABLE 1.1

| Syntax | Values | No. of bits | Mnemonic |
|---|---|---|---|
| HRBM ( ){ | | | |
|     message_id | | 16 | |
|     version | | 8 | |
|     length | | 16 | |
|     extension { | | | |
|         extension_fields_Byte | | | |
|     } | | | |
|     message_payload{ | | | |
|         max_buffer_size | | 32 | |
|         fixed_end_to_end_delay | | 32 | |
|         max_transmission_delay | | 32 | |
|     } | | | |
| } | | | | message_id—message identifier of HRBM
version—message version of HRBM
length—message length of HRBM
extension_fields_Byte—extension field of HRBM
max_buffer_size—maximum buffer size of HRBM
fixed_end_to_end_delay—end-to-end network delay
max_transmission_delay—maximum transmission delay At $t_0$=18:00:00, the server receives the request, where fixed_end_to_end_delay=$\Delta t$=2 s. Duration of an independent decodable media unit can be obtained from a video resource, where MU_duration=0.5 s.

$$\Delta t = 2 \text{ s}$$

$$t_{tmp} = t_0 + \Delta t = 18:00:02$$

$$t_{ini} = 18:00:022$$

The server sends, at $t_0$=18:00:00, a resource of $t_{ini}$=18:00:022, and a time at which the client receives a first media resource is 18:00:02, and according to timestamp information timestamp equal to 18:00:022 of the received first media resource, a current media unit is buffered, and the resource is played at 18:00:022.

In this way, a user can watch the posture of another athlete in a different view angle in synchronization between a broadcast and a video on-demand, so as to well resolve the problem that user media resources of broadcast and broadband are asynchronous caused by different network conditions in heterogeneous network transmission.

Embodiment 2

Figure 2:
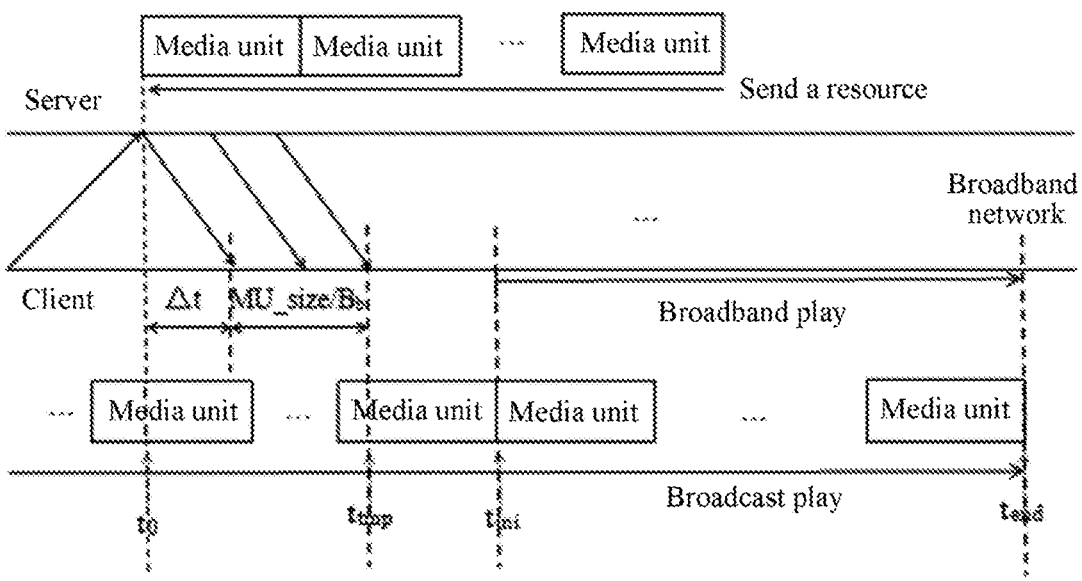
FIG. 2 is a schematic timing diagram of a second embodiment of the present disclosure.

The overall technical line used this embodiment is: to obtain information such as broadband network delays and available bandwidths of different users by using a corresponding method in a network, for changing a start time at which a server starts to transmit a broadband resource, thereby implementing synchronization of a multimedia resource in a heterogeneous network. The illustrations of this embodiment are shown in FIG. 2 and FIG. 4.

Figure 4:
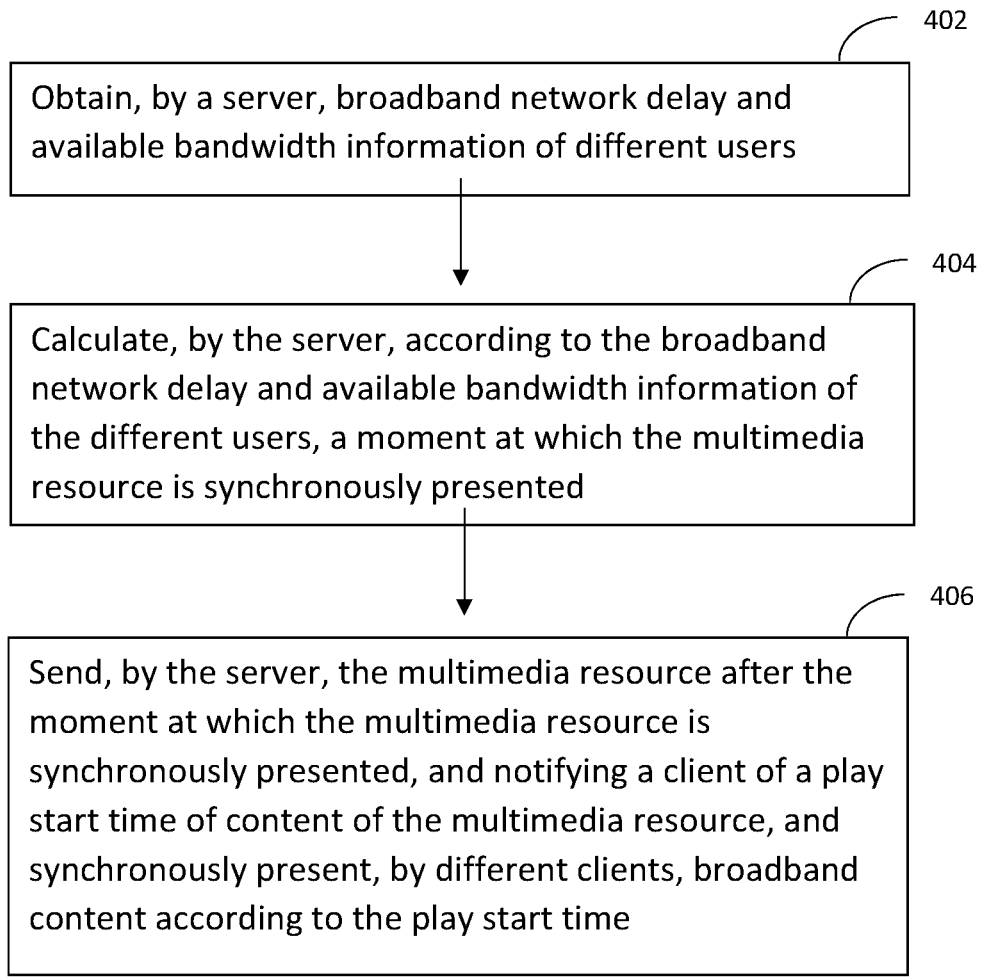
FIG. 4 is a flowchart illustrating another example method according to the second embodiment of the present disclosure.

Specifically, method steps of this embodiment are shown in FIG. 4, and the steps include:

first, at step 402, a server may obtain information such as broadband network delays and available bandwidths of different users according to some methods, for example, by using signaling information fed back by a client, or by means of estimation measurement;

secondly, at step 404, for a case in which at a particular moment, different users in a heterogeneous network media service request the server for a same multimedia resource or switch different multimedia resources or re-request for a multimedia resource due to network condition deterioration, to make content of the multimedia resources synchronously presented, after receiving a user request, the server calculates, according to network delay conditions of different users, a moment at which the multimedia resource can be synchronously presented; and finally, at step 406, the server sends the resource after the moment at which the resource can be synchronously presented, notifies the client of a play start time of the media content, so that broadband part content of the different users can be synchronously presented.

Referring to FIG. 2, in a specific embodiment, the specific implementation is as follows:

step 1: a server receives a client request at a to moment, a downlink broadband network delay of different user groups is Δt, an available bandwidth is $B_b$, a video bit rate is $B_r$, and duration of an independent decodable media unit MU is MU_duration;

step 2: when the broadband network delays and the available bandwidths of the users are different, the server sends, at a to moment, a multimedia resource at a $t_{ini}$ moment to ensure synchronization, where $t_{ini}$ is a start moment of a first complete MU after $t_{tmp}$, and as shown in formula (1), formula (2), and formula (3);

$$0 \le t_{ini} - t_{tmp} < MU\_duration \quad (1)$$

$$MU\_size = MU\_duration * B_r \quad (2)$$

$$t_{tmp} = t_0 + MU\_size/B_b + \Delta t \quad (3)$$

In formula (3), to is a sending moment, MU_size is an average size of sent MUs, and see formula (2) for specific calculation, MU_duration is media unit duration, $B_r$ is a constant bit rate at which the multimedia resource is played, $B_b$ is an available bandwidth of a broadband network, Δt is a downlink broadband network delay, and $t_{tmp}$ is a moment that is obtained by calculation and at which the client receives the first MU.

In a preferred implementation, the foregoing parameters can select the following values:

MU_size: 0 Mbits to 100 Mbits, preferably, 30 Mbits;
MU_duration: 0 s to 10 s, preferably, 0.5 s;
$B_r$: 0 Mbps to 50 Mbps, preferably, 25 Mbps;
$B_b$: 0 Tbps to 1 Tbps, preferably, 1 Mbps; and
Δt: 0 to ∞, preferably, 2 s; and step 3: because initially sent content is the multimedia source at and after the $t_{ini}$ moment, and to enable a broadband and a broadcast to be synchronous, after a client receives the first complete MU through the broadband, the first MU is not immediately played, but instead, the media content at this moment is played at and after the $t_{ini}$ moment.

A specific example of multimedia resource synchronization is provided below. A manner of a client request and a manner of notifying the client by the server are not limited in this embodiment. A signaling manner is used as an example below, and signaling is based on the MMT protocol. Certainly, in other embodiments, the signaling may also be applicable to other media protocols, which are not limited to the MMT protocol.

When a user is watching an Olympic live program, because there are a large number of excellent performances, and people have different preferences, the program party specially shoots videos in a plurality of view angles for audience to select.

At this moment, when the audience watches a main program, the audience also watches a close-up performance of a particular athlete in a small image. However, the game of the athlete is completed soon, and the audience wants to immediately change an angle to watch the posture of another athlete. Then the audience sends a request to the server. The request signaling should include a network delay network_delay and available bandwidth information network_bandwidth. The request message request_message is shown in the following Table 2.1:

TABLE 2.1

| Syntax | Value | No. of bits | Mnemonic |
|---|---|---|---|
| request_message( ) { | | | |
|   message_id | | 8 | uimsbf |
|   version | | 8 | uimsbf |
|   length | | 16 | uimsbf |
|   message_payload( ) | | | |
|   { | | | |
|     network_delay | | 16 | uimsbf |
|     network_bandwidth | | 32 | uimsbf |
|   } | | | |
| } | | | |

At $t_0$=18:00:00, the server receives the request, where Δt=2 s and $B_b$=512 Kbit/s. The video bit rate and duration of an independent decodable media unit can be obtained from a video resource, where $B_r$=16482 Kbit/s and MU_duration=0.5 s.

$$MU\_size = MU\_duration * B_r = 0.5 * 16482 = 8241 \text{ bits}$$

$$\Delta T = MU\_size/B_b + \Delta t = 8241/512 + 2 = 16.10 \text{ s}$$

$$t_{tmp} = t_0 + \Delta T = 18:00:1610$$

$$t_{ini} = 18:00:1641$$

The server sends, at a $t_0$=18:00:00 moment, a resource of $t_{ini}$=18:00:1641, and when sending the resource, the server needs to send a piece of downlink signaling to notify the client of a sequence number of a first sent independent decodable media resource to notify a user of a play time. A response message response_message is as follows:

TABLE 2.2

| Syntax | Value | No. of bits | Mnemonic |
|---|---|---|---|
| response_message( ) { | | | |
|    message_id | | 8 | uimsbf |
|    version | | 8 | uimsbf |
|    length | | 16 | uimsbf |
|    message_payload( ) | | | |
|    { | | | |
|      number_of_assets | N | 16 | uimsbf |
|      for(i=0; i<N; i++) | | 32 | uimsbf |
|      { | | | |
|        asset_id | | 16 | uimsbf |
|        mpu_sequence_number | | 32 | uimsbf |
|      } | | | |
|    } | | | |
| } | | | |

The client looks up in the table according to a first media resource sequence known in the signaling, to obtain time information timestamp=18:00:1641 and the size MU_size=33 Mbits, and that a moment at which the current client receives the resource is 18:00:1610, buffers the current media unit, and plays the resource at 18:00:1641.

In this way, a user can watch the posture of another athlete in a different view angle in synchronization between a broadcast and a video on-demand, to resolve the problem that user media resources of broadcast and broadband are asynchronous caused by different network conditions in heterogeneous network transmission.

Figure 5:
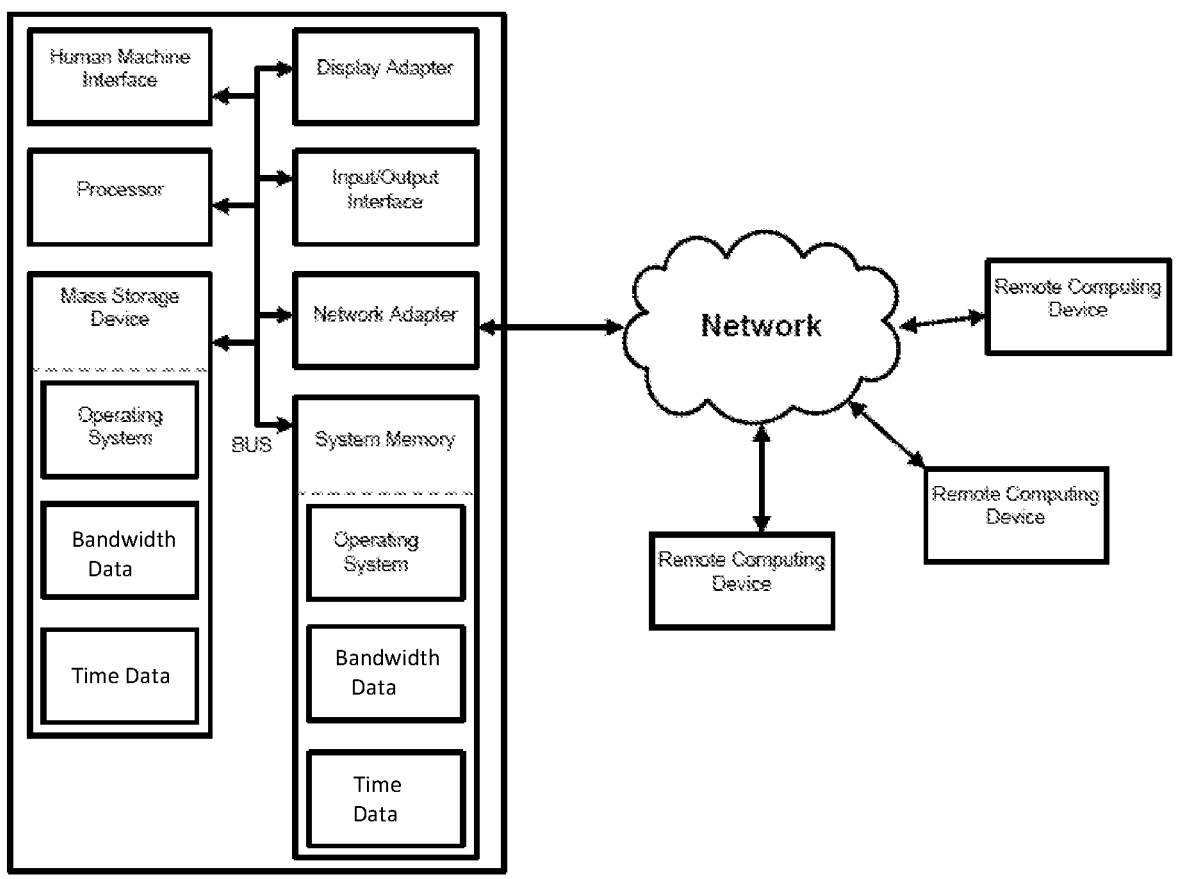
FIG. 5 is an illustration of an example computing device in which the present methods and systems can operate.

Referring to FIG. 5, the methods and systems of the present disclosure can be implemented on one or more computers. Specifically, a server and any client device can be one or more computers or remote computing devices in FIG. 5. The methods and systems disclosed can utilize one or more computers to perform one or more functions in one or more locations. The processing of the disclosed methods and systems can also be performed by software components. The disclosed systems and methods can be described in the general context of computer-executable instructions such as program modules, being executed by one or more computers or devices. For example, the server includes a bandwidth data processing module configured to obtain broadband network delay and available bandwidth information for different users at respective remote locations. As another example, the server also includes a synchronization module configured to calculate a moment at which the multimedia resource can be is synchronously presented according to the broadband network delay and available bandwidth information of the different users. As another example, the server also includes a notification module configured to notify a client of a play start time of content of the multimedia resource after the moment at which the multimedia resource is synchronously presented. As another example, the server can also include a content delivery module configured to synchronously present broadband content according to the play start time by different clients. The server can be located in the server in a central location, whereas the client devices (remote computing devices) can be located at respective user's location. These program modules can be stored on the mass storage device of the server and one or more client devices. Each of the operating modules can comprise elements of the programming and the data management software.

The components of the server and/or client device can comprise, but are not limited to, one or more processors or processing units, a system memory, a mass storage device, an operating system, a system memory, an Input/output interface, a display device, a display interface, a network adaptor, and a system bus that couples various system components. The server and one or more client devices can be implemented over a wired or wireless network connection at physically separate locations. By way of example, a remote client device can be a personal computer, portable computer, smartphone, a network computer, a peer device, or other common network node, and so on. Logical connections between the server and one or more client devices can be made via a network, such as a local area network (LAN) and/or a general wide area network (WAN).

The foregoing specific embodiments further describe, in detail, the technical problem resolved by the present disclosure, and the technical solutions and beneficial effects of the present disclosure. It should be understood that the foregoing descriptions are merely specific embodiments of the present disclosure, and are not intended to limit the present disclosure. Any modification, equivalent replacement, improvement, and the like made within the spirit and principle of the present disclosure should fall within the protection scope of the present disclosure.

What is claimed is:

1. A method for synchronously pushing a multimedia resource based on a heterogeneous network, wherein the method is any one of the following two methods:

method 1: comprising the following steps:

step 1, obtaining, by a server, an end-to-end broadband network delay of different users;

step 2: after receiving a client request, calculating, by the server according to the end-to-end broadband network delay of the different users, a moment $t_{tmp}$ at which the client receives a first independent decodable media unit (MU); and step 3: sending at a to moment, by the server, the multimedia resource at a $t_{ini}$ moment, which is a start moment of a first complete independent decodable media unit MU after the moment $t_{tmp}$, at which the multimedia resource is synchronously presented, and synchronously playing, by the client, content according to a start presentation time of the multimedia resource, at and after the $t_{ini}$ moment, so that broadband content of the different users is synchronously presented, wherein in the step 2 of the method 1, when the end-to-end broadband network delay Δt of the different users is different, the server sends, at the $t_0$ moment, another multimedia resource at the $t_{ini}$ moment to ensure synchronization, wherein the $t_{ini}$ moment is a start moment of a first complete independent decodable media unit (MU) after the moment $t_{tmp}$, wherein $$0 \leq t_{ini} - t_{tmp} < MU\_duration$$

$$t_{tmp} = t_0 + \Delta t$$

in the formula, $t_0$ is a sending moment, MU_duration is media unit duration, Δt is the end-to-end broadband network delay, and $t_{tmp}$ is a moment that is obtained by calculation and at which the client receives a first independent decodable media unit MU;

method 2: comprising the following steps:

step 1: obtaining, by a server, a client request, a broadband network delay Δt and available bandwidth of different users, and duration of an independent decodable media unit MU (media unit) MU_duration;

step 2: after receiving the client request, calculating, by the server according to the broadband network delay Δt and the available bandwidth of the different users, a moment $t_{tmp}$ at which the client receives a first independent decodable media unit (MU); and step 3: sending at a $t_0$ moment, by the server, the multimedia resource at a $t_{ini}$ moment, which is a start moment of a first complete independent decodable media unit MU after the moment $t_{tmp}$, at which the multimedia resource is synchronously presented, and notifying a client of a play start time of content of the multimedia resource, and synchronously presenting, by different clients, broadband content according to the play start time at and after the $t_{ini}$ moment.

2. The method for synchronously pushing the multimedia resource based on the heterogeneous network according to claim 1, wherein
a value of MU_duration is: 0 s to 10 s; and
a value of Δt is: 0 to ∞.

3. The method for synchronously pushing the multimedia resource based on the heterogeneous network according to claim 2, wherein
the value of MU_duration is: 0.5 s; and
the value of Δt is: 2 s.

4. The method for synchronously pushing the multimedia resource based on the heterogeneous network according to claim 3, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

5. The method for synchronously pushing the multimedia resource based on the heterogeneous network according to claim 2, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

6. The method for synchronously pushing the multimedia resource based on the heterogeneous network according to claim 1, wherein in the step 3 of the method 1, the content, which is initially sent by the server is the multimedia resource after the $t_{ini}$ moment, and to enable a broadband and a broadcast to be synchronous, after receiving the first complete MU by using the broadband, the client does not immediately play the first MU, but instead, plays, at the $t_{ini}$ moment, the multimedia resource at this moment.

7. The method for synchronously pushing the multimedia resource based on the heterogeneous network according to claim 6, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

8. The method for synchronously pushing the multimedia resource based on the heterogeneous network according to claim 1, wherein in the method 1, the server sends the multimedia resource to the client, and the client synchronously plays the content according to the start presentation time of the multimedia resource.

9. The method for synchronously pushing the multimedia resource based on the heterogeneous network according to claim 8, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

10. The method for synchronously pushing the multimedia resource based on the heterogeneous network according to claim 1, wherein in the step 2 of the method 2, when the broadband network delay Δt and the available bandwidth of the different users are different, the server sends, at the $t_0$ moment, another multimedia resource at the $t_{ini}$ moment to ensure synchronization, wherein the $t_{ini}$ moment is a start moment of a first complete independent decodable media unit MU after $t_{tmp}$, wherein $$0 \le t_{ini} - t_{tmp} < \text{MU\_duration}$$

$$\text{MU\_size} = \text{MU\_duration} * B_r$$

$$t_{tmp} = t_0 + \text{MU\_size}/B_b + \Delta t$$

in the formula, $t_0$ is a sending moment, MU_size is an average size of sent MUs, MU_duration is media unit duration, $B_r$ is a constant bit rate at which the multimedia resource is played, $B_b$ is an available bandwidth of a broadband network, Δt is the broadband network delay, and $t_{tmp}$ is a moment that is obtained by calculation and at which the client receives a first independent decodable media unit MU.

11. The method for synchronously pushing the multimedia resource based on the heterogeneous network according to claim 10, wherein
a value of MU_size is: 0 Mbits to 100 Mbits;
a value of MU_duration is: 0 s to 10 s;
a value of $B_r$ is: 0 Mbps to 50 Mbps;
a value of $B_b$ is: 0 Tbps to 1 Tbps; and
a value of Δt is: 0 to ∞.

12. The method for synchronously pushing the multimedia resource based on the heterogeneous network according to claim 11, wherein
the value of MU_size is: 30 Mbits;
the value of MU_duration is: 0.5 s;
the value of $B_r$ is: 25 Mbps;
the value of $B_b$ is: 1 Mbps; and
the value of Δt is: 2 s.

13. The method for synchronously pushing the multimedia resource based on the heterogeneous network according to claim 12, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

14. The method for synchronously pushing the multimedia resource based on the heterogeneous network according to claim 11, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

15. The method for synchronously pushing the multimedia resource based on the heterogeneous network according to claim 10, wherein in the step 3 of the method 2, the content, which is initially sent by the server is the multimedia resource after the $t_{ini}$ moment, and to enable a broadband and a broadcast to be synchronous, after receiving the first complete MU by using the broadband, the client does not immediately play the first MU, but instead, plays, at the $t_{ini}$ moment, the multimedia resource at this moment.

16. The method for synchronously pushing the multimedia resource based on the heterogeneous network according to claim 10, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

17. The method for synchronously pushing the multimedia resource based on the heterogeneous network according to claim 1, wherein in the method 2, when sending the multimedia resource, the server sends a piece of downlink signaling to notify the client of a sequence number of a first sent independent decodable media resource to notify a user of a play time.

18. The method for synchronously pushing the multimedia resource based on the heterogeneous network according to claim 1, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

19. The method for synchronously pushing the multimedia resource based on the heterogeneous network according to claim 1, wherein either the method 1 or the method 2 is applicable to a case in which at a particular moment, the different users in the heterogeneous network media service request the server for a same multimedia resource or switch different multimedia resources or re-request for another multimedia resource due to network deterioration, to make the content of the multimedia resources synchronously presented.

* * * * *